US006811732B2

(12) United States Patent
Marumasu

(10) Patent No.: US 6,811,732 B2
(45) Date of Patent: Nov. 2, 2004

(54) METHOD FOR MANUFACTURING POLYMER INSULATOR

(75) Inventor: Toshiro Marumasu, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 105 days.

(21) Appl. No.: 09/979,855

(22) PCT Filed: Mar. 26, 2001

(86) PCT No.: PCT/JP01/02416

§ 371 (c)(1), (2), (4) Date: Apr. 23, 2002

(87) PCT Pub. No.: WO01/73798

PCT Pub. Date: Oct. 4, 2001

(65) Prior Publication Data

US 2002/0149130 A1 Oct. 17, 2002

(30) Foreign Application Priority Data

Mar. 29, 2000 (JP) ........................................ 2000-90418

(51) Int. Cl.[7] .......................... B29C 65/06; B29C 65/18

(52) U.S. Cl. ........................ 264/145; 264/162; 264/163; 264/254; 264/255; 264/271.1

(58) Field of Search ................................ 264/138, 145, 264/162, 163, 250, 254, 255, 259, 271.1; 174/168, 169, 172, 186; 426/112, 121, 289, 194, 198, 299, 302.1, 294, 298

(56) References Cited

U.S. PATENT DOCUMENTS 4,246,696 A 1/1981 Bauer et al.
4,281,943 A * 8/1981 Viennot ...................... 403/267
4,373,113 A * 2/1983 Winkler et al. ............ 174/179
5,336,852 A * 8/1994 Goch et al. ................ 174/176
5,484,564 A * 1/1996 Goto .......................... 264/219
5,563,379 A * 10/1996 Kunieda et al. ........... 174/169
5,804,122 A * 9/1998 Ishino ........................ 264/261
5,915,761 A 6/1999 Moriya et al.
5,977,487 A * 11/1999 Kuhl .......................... 174/176

FOREIGN PATENT DOCUMENTS

JP 54-65392 5/1979
JP 9-153315 6/1997
JP 9-237537 9/1997
JP 10-321067 12/1998

* cited by examiner

*Primary Examiner*—Angela Ortiz
(74) *Attorney, Agent, or Firm*—Burr & Brown

(57) ABSTRACT

A method of producing a polymer insulator and an end processing apparatus utilized for the method. The insulator has a core, an overcoat member arranged on the core, and a fitting member for securing the core at its both ends, wherein the core and the fitting member are secured under pressure at both ends of the core by contacting a ring-shaped protrusion portion arranged at both ends of the overcoat member to an open inner end of the fitting member. The method includes the steps of: forming the overcoat member on the core; forming the ring-shaped protrusion portion integrally with the overcoat member by processing an end portion of the overcoat member, and securing the fitting member.

4 Claims, 4 Drawing Sheets

METHOD FOR MANUFACTURING POLYMER INSULATOR

TECHNICAL FIELD

The present invention relates to a method of producing a polymer insulator, which comprises a core, an overcoat member arranged on the core, and a fitting member for securing the core at its both ends, and, wherein the core and the fitting member are secured under pressure at both ends of the core by contacting a ring-shaped protrusion portion arranged at both ends of the overcoat member to an open inner end of the fitting member. The invention also relates to an end processing apparatus utilized for this producing method.

BACKGROUND ART

Usually, as shown in FIG. 4, a polymer insulator 51 used for electric power transmission and distribution comprises an FRP core 52, an overcoat member 53 arranged on the FRP core 52, and a fitting member 54 for securing the FRP core 52 and the overcoat member 53 at both ends. In the polymer insulator 51 having the construction mentioned above, there is the possibility that the polymer insulator 51 may be broken or lose its function due to the following reasons:

(1) Fitting strength is decreased due to an erosion of the fitting member 54;

(2) Cracking occurs at the overcoat member 53 and the FRP core 52, so that an electric insulation defect is generated; and (3) As a worst case, a brittle fracture of the FRP core 52 occurs since an alkali component is eluted into a glass component in the FRP core 52 to which stress is applied.

Therefore, water intrusion into the fitting member 54 must be prevented.

In order to achieve a complete water proof condition between the fitting member 54 and the overcoat member 53, a ring-shaped protrusion portion 55 is arranged at both ends of the overcoat member 53 and a portion having the protrusion portion 55 is secured to the fitting member, so that the protrusion portion 55 serves as an O-ring. This method is disclosed in Japanese Patent Publication No. 2664616, and it achieves satisfactory results. In this method, in order to obtain such a water proof condition by contacting under pressure the protrusion portion 55 and the fitting member 54, an inner diameter of the fitting member is adjusted suitably and the thus obtained fitting member may be connected to the protrusion portion 55.

In the polymer insulator 51 wherein the protrusion portion 55 is arranged at the end of the overcoat member 53, the overcoat member 53 is formed around the FRP core 52 by using a metal mold. Therefore, it is not possible to vary the position of the protrusion portion 55 formed integrally with the overcoat member 53 once it is formed. As a result, there arises a problem wherein the shape and the number of the protrusion portion 55 to be formed cannot be substantially varied. Moreover, when a polymer insulator having a little shorter length is to be obtained by reducing the number of sheds of the polymer insulator 51, it is necessary to change the metal mold and therein arises a problem as such a metal mold change requires a considerable amount of time. Further, it is impossible to re-create a polymer insulator having a little shorter length by reducing the number of sheds of the ready-made polymer insulator. Therefore, it is difficult to effectively process a small-lot order, and productivity decreases if such a small-lot order is undertaken.

An object of the invention is to eliminate the drawbacks mentioned above and to provide a method of producing a polymer insulator and to provide an end processing apparatus utilized for this method, wherein the shape and number of protrusion portions to be formed can be varied without changing the metal mold, and, wherein a product having a suitable length can be obtained by varying the number of sheds of a ready-made formed body.

SUMMARY OF THE INVENTION

According to the invention, a method is provided for producing a polymer insulator having a core, an overcoat member arranged on the core, and a fitting member for securing the core at both ends. The core and the fitting member are secured under pressure at both ends of the core by contacting a ring-shaped protrusion portion arranged at both ends of the overcoat member to an open inner end of the fitting member. The method comprises the steps of forming the overcoat member on the core; forming the ring-shaped protrusion portion integrally with the overcoat member by processing an end portion of the overcoat member, and securing the fitting member.

Moreover, an end processing apparatus utilized for the method of producing the polymer insulator mentioned above, comprises a core holder for holding a core, a rotation drive device arranged rotatably around the core holder at a center of a central axis of the core, and a whetstone having a shape for forming an end portion of an overcoat member of the polymer insulator. The whetstone is arranged to the rotation drive device rotatably around its center axis, wherein the whetstone itself is rotated and the rotated whetstone is rotated around the end portion of the overcoat member on the core held by the core holder, so that a protrusion portion is formed integrally with the end portion.

In the method of producing the polymer insulator according to the invention, the ring-shaped protrusion portion is formed integrally with the overcoat member by processing the end portion of the overcoat member. Therefore, it is possible to easily vary the shape and number of protrusion portions to be formed. Moreover, as a preferred embodiment, the producing method further includes the steps of cutting the overcoat member of the polymer insulator to a predetermined length, and processing an end portion of the thus cut overcoat member so that the ring-shaped protrusion portion and the overcoat member are integrally formed. In this case, it is possible to obtain the polymer insulator having a predetermined length from the ready-made or stocked polymer insulator. Therefore, according to the method and apparatus of the invention, it is possible to effectively process a small-lot order and to increase productivity by reducing the number of metal mold changing operations. In addition, the ring-shaped protrusion portion can be formed to the end portion of the overcoat member on the basis of the center of the core. Therefore, it is possible to obtain the ring-shaped protrusion portion which can achieve better securing, even if the overcoat member is eccentric at the processing position.

DETAILED DESCRIPTION OF THE INVENTION

Figure 1A:
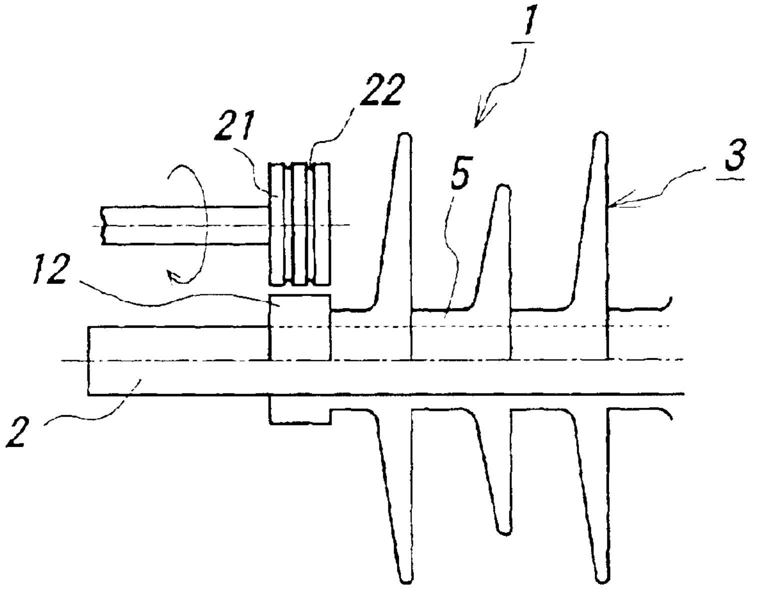
FIGS. 1(*a*)–(*c*) are schematic views respectively explaining one embodiment of a method of producing a polymer insulator according to the invention.
Figure 1B:
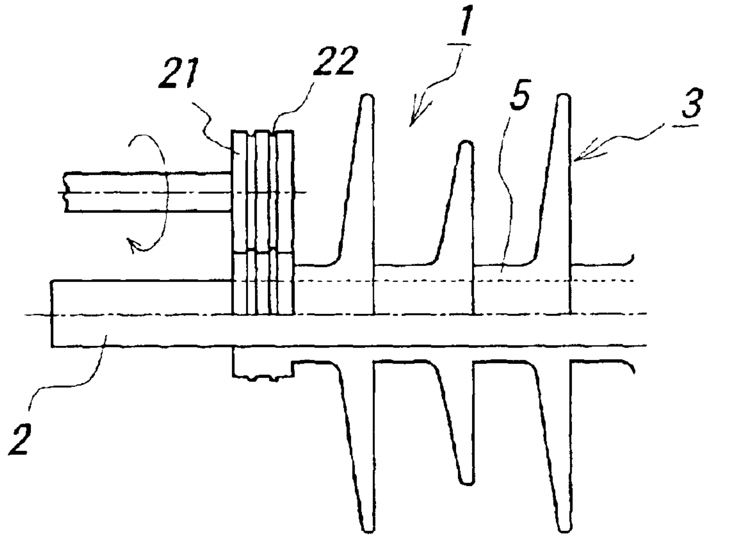
Figure 1C:
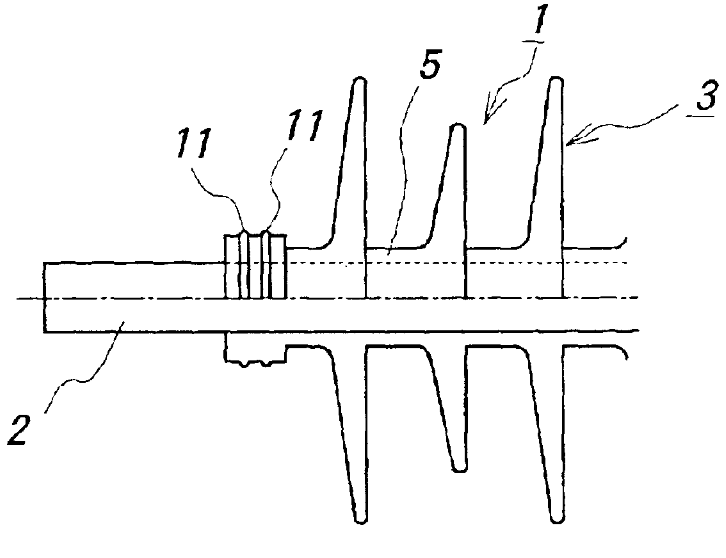
Figure 2A:
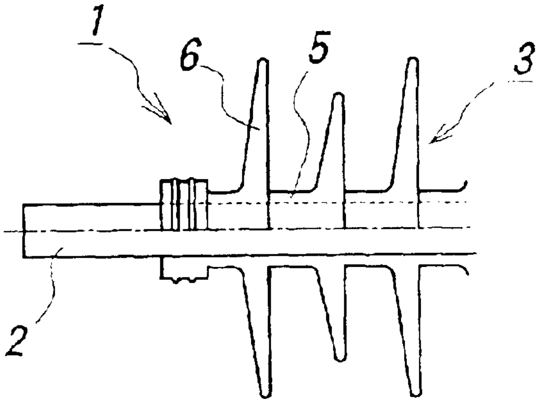
FIGS. 2(*a*)–(*d*) are schematic views respectively explaining another embodiment of a method of producing a polymer insulator according to the invention.
Figure 2B:
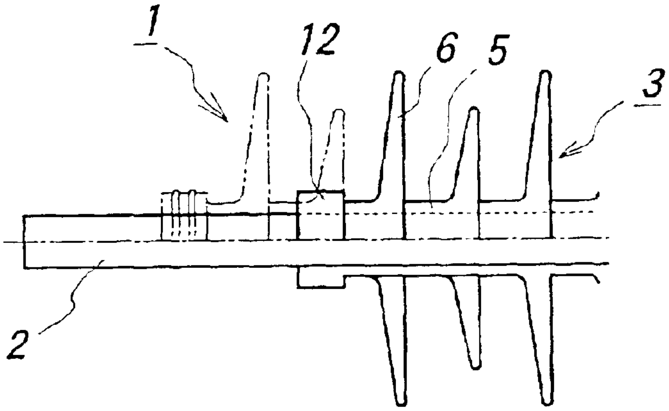
Figure 2C:
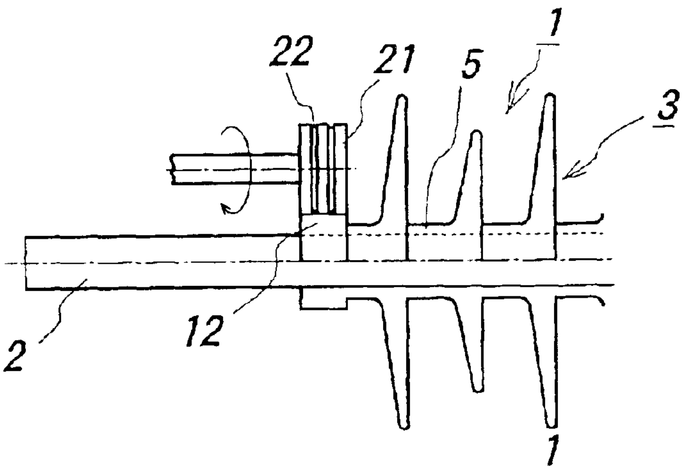
Figure 2D:
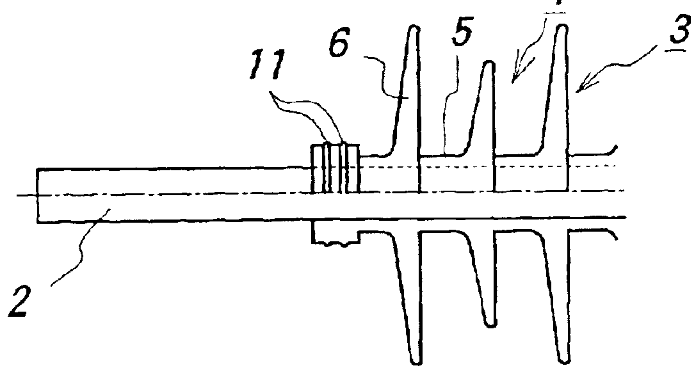

FIGS. 1(*a*)–(*c*) are schematic views respectively explaining one embodiment of a method of producing a polymer insulator according to the invention. In FIGS. 1(*a*)–(*c*), a polymer insulator 1 comprises an FRP core 2, an overcoat member 3 made of for example silicone rubber, which is arranged on the FRP core 2, and a fitting member (not shown) for securing the FRP core 2 and the overcoat member 3 at both ends. In the polymer insulator 1 referenced above, the fitting member and the FRP core 2 are secured under pressure by contacting a ring-shaped protrusion portion 11 arranged at both ends of the overcoat member 3 to an open inner end of the fitting member. This connection serves as a sealing mechanism. In addition, numeral 5 is a sheath portion of the overcoat member 3 and numeral 6 is a shed of the overcoat member 3 (FIGS. 2(*a*)–(*d*)).

Before the processing of the protrusion portion shown in FIGS. 1(*a*)–(*c*), the overcoat member 3 is arranged on the FRP core 2 by using known forming methods such as compression forming, injection forming, transfer forming and so on. Moreover, after the processing of the protrusion portion shown in FIGS. 1(*a*)–(*c*), the fitting member is secured to the overcoat member 3 at both ends.

With reference to FIGS. 1(*a*)–(*c*), the preferred method of producing the polymer insulator according to the invention will be explained. At first, as shown in FIG. 1(*a*), a large diameter portion 12 having a diameter larger than that of the sheath portion 5 of the overcoat member 3 is arranged at an end portion of the overcoat member 3. The large diameter portion 12 has a substantially same width as that of a whetstone 21 used for processing. Then, as shown in FIG. 1(*b*), the whetstone 21 rotated at a high speed is moved gradually from an idling position shown in FIG. 1(*a*) to a finish machining position by rotating it around a center axis of the polymer insulator 1. In this case, the protrusion portion 11 is formed at the large diameter portion 12 by using a recess 22 arranged at an outer surface of the whetstone 21. As a result, as shown in FIG. 1(*c*), it is possible to arrange the ring-shaped protrusion portion 11 at the end portion of the overcoat member 3. In the method mentioned above, the protrusion portion 11 having a diameter larger than that of the sheath portion 5 of the overcoat member 3 is formed by arranging the large diameter portion 12 at the end portion of the overcoat member 3 and grinding the large diameter portion 12 by the whetstone 21. However, it is possible to grind directly the end portion of the sheath portion 5 of the overcoat member 3 without using the large diameter portion 12. In this case, the connection may be achieved by varying an inner diameter of the open inner end of the fitting member.

As mentioned above, in the case where the protrusion portion 11 used also for the sealing function is arranged at the end portion of the overcoat member 3 by means of the whetstone 21, it is possible to vary the shape and number of the protrusion portion 11 without changing the metal mold. The metal mold change incurs a considerable expense since the metal mold is expensive. Moreover, the metal mold changing operation takes a lot of time. Therefore, the present invention mentioned above can be largely contributed to a reduction of cost and an increase of productivity.

FIGS. 2(*a*)–(*d*) are schematic views respectively explaining another embodiment of a method of producing a polymer insulator according to the invention. In FIGS. 2(*a*)–(*d*), items similar to those of FIGS. 1(*a*)–(*c*) are denoted by the same reference numerals and the explanations thereof are omitted here. The embodiment shown in FIGS. 2(*a*)–(*d*) is different from the embodiment shown in FIGS. 1(*a*)–(*c*) and shows the case where the polymer insulator which exists previously as a stock product is shortened. At first, as shown in FIG. 2(*a*), a formed body of the polymer insulator, wherein the overcoat member 3 is arranged on the FRP core 2 and the protrusion portion 11 is arranged at the end portion of the overcoat member 3, is prepared. Then, as shown in FIG. 2(*b*), the end portion of the overcoat member 3 is cut out to a predetermined length. For example, 10 sheds are reduced to 8 sheds by this cutting operation. In this case, it is preferred to arrange the large diameter portion 12 at a root portion of the shed portion 6. Then, as shown in FIG. 2(*c*), the large diameter portion 12 is processed by the whetstone 21. After the processing, it is possible to obtain the overcoat member 3 having a desired protrusion portion 11 as shown in FIG. 2(*d*).

As mentioned above, the polymer insulator having a desired length is obtained by varying the number of sheds of the existing polymer insulator formed body. Therefore, it is possible to reduce the number of stocked metal molds and to address a small-lot order rapidly, thereby increasing productivity.

In the embodiments explained with reference to FIGS. 1(*a*)(c) and FIGS. 2(*a*)–(*d*), the overcoat member 3 is formed on the FRP core 2 by forming methods such as compression forming, injection forming, transfer forming and so on. However, the forming method of the overcoat member 5 is not limited to the above methods. For example, the present invention may be applied to the case where the sheath portion 5 of the overcoat member 3 is formed on the FRP core 2 by means of a metal molding or an extrusion using a cross-head. The shed portions 6 are then formed by a separate metal molding than that of the sheath portion and adhered to the sheath portion 5 at respective predetermined positions, so as to produce the polymer insulator formed body. Also in this case, when the protrusion portion 11 used for sealing is formed having a diameter larger than that of the sheath portion 5, the large diameter portion 12 may be formed by arranging, for example, RTV rubber on the sheath portion 5 at the end portion of the overcoat member 3. After curing the RTV rubber, the large diameter portion 12 is processed by the whetstone 21. If the protrusion portion 11 has a diameter equal to or less than that of the sheath portion 5, it is a matter of course that it is not necessary to arrange the RTV rubber on the sheath portion 5.

Figures 3A, 3B:
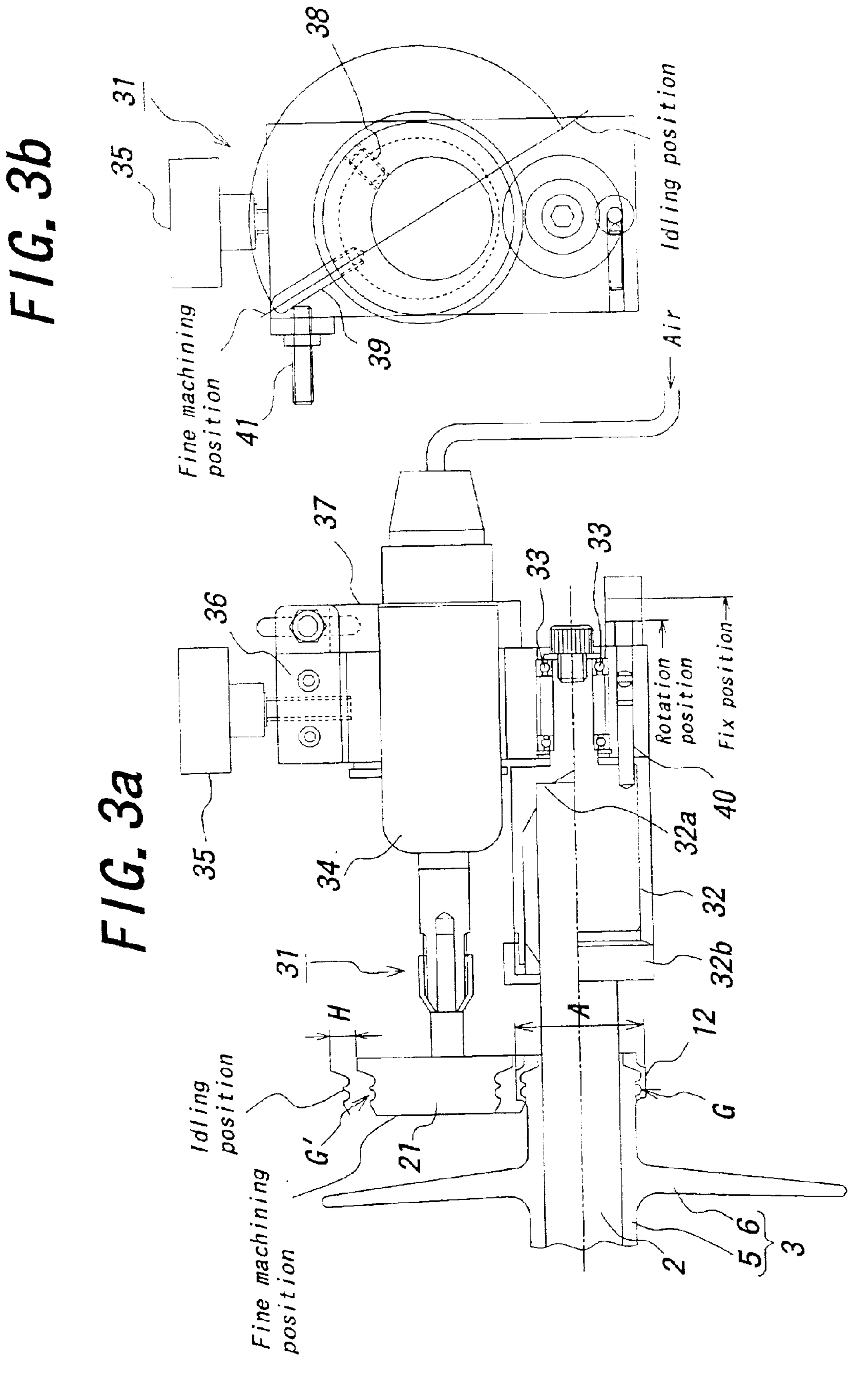
FIGS. 3(*a*) and (*b*) are schematic views respectively showing one embodiment of an end processing apparatus utilized for a method of producing a polymer insulator according to the invention.
Figure 4:
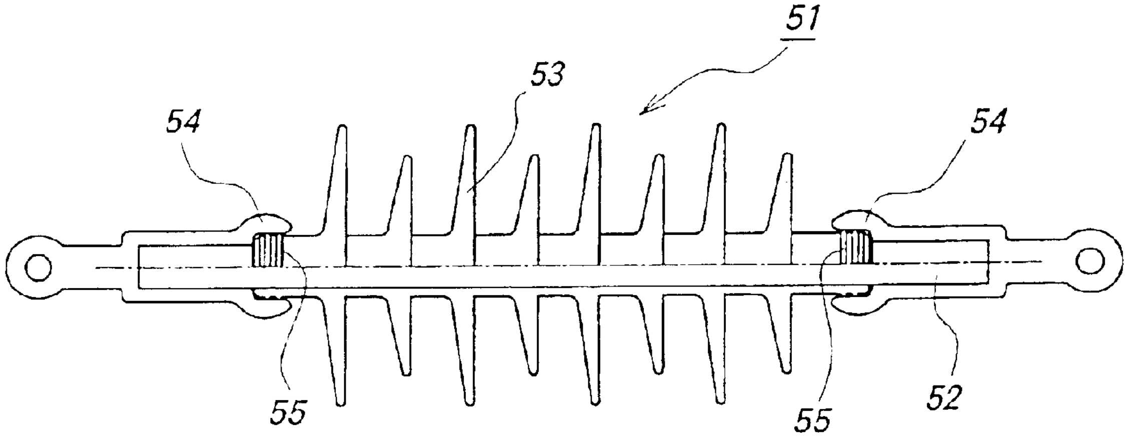
PRIOR ART FIG. 4
FIG. 4 is a schematic view illustrating one embodiment of a known polymer insulator.

FIGS. 3(*a*) and (*b*) are schematic views showing one embodiment of an end processing apparatus used for a method of producing a polymer insulator according to the invention. In the embodiment shown in FIGS. 3(*a*) and (*b*), an end processing apparatus 31 comprises an FRP core holder 32 for holding the FRP core 2, a high-speed air grinder 34 arranged rotatably around the FRP core holder 32 via a bearing 33, whose rotation center is a central axis of the FRP core, and a whetstone 21 having a shape of an outer surface for forming the protrusion portion 11 and arranged rotatably to the high-speed air grinder 34 at its central axis. At the end portion of the overcoat member 3 arranged on the FRP core 2 held by the FRP core holder 32, the whetstone 21 itself is rotated and the rotated whetstone 21 is rotated around the end portion of the overcoat member 3 by utilizing a knob 35, so that the protrusion portion 11 is formed integrally with the end portion. The high-speed air grinder 34 is secured to a grinder holder 36 via an eccentric bush 37, and it is fixed to the eccentric bush 37 by means of a setscrew 38. The end processing apparatus 31 can take a fine machining position during a processing state and an idling state during a non-processing state by varying a position of the eccentric bush 37 in the grinder holder 36 by means of a finger grip 39. The eccentric bush 37 can stop at any position between the fine machining position and the idling position by setting the knob 35 at arbitrary positions. Moreover, numeral 40 is a holder fix pin and numeral 41 is a stopper.

The end portion processing by using the end processing apparatus 31 having the construction mentioned above is as follows.

(1) The polymer insulator formed body is cut out to a predetermined length. After that, the overcoat member 3 corresponding to an exposed portion (fitting member securing portion) of the FRP core 2 is cleaned up by a suitable cleaning method.

(2) The shed positioned at a portion corresponding to the protrusion portion 11 to be formed is cut out at its root portion. After that, the large diameter portion 12 is formed.

(3) The exposed portion of the FRP core 2 is inserted into the FRP core holder 32 and a tip of the exposed portion is contacted to a contact surface 32*a*. The FRP core 2 is then fixed to the FRP core holder 32 by screwing a part 32*b*. When the exposed portion of the FRP core 2 is inserted into and fixed to the FRP core holder 32, the whetstone 21 is at the idling position, and thus the whetstone 21 does not stand in the way for this insert and fix process.

(4) After the exposed portion of the FRP core 2 is completely fixed to the FRP core holder 32, air is supplied to the high-speed air grinder 34 so as to rotate the whetstone 21.

(5) After loosening the knob 35, the finger grip 39 moves from the idling position to the fine machining position so that the whetstone 21 approaches the large diameter portion 12 of the overcoat member 3. When a predetermined amount of grinding is finished, the whetstone 21 is fixed at that position by screwing the knob 35. Then, the holder fix pin 30 is pulled out to a rotation position.

(6) The grinder holder 36 (whetstone 21) is gradually rotated around the central axis of the FRP core 12, while holding a main body of the grinder holder 36 or the knob 35 by hand. If the end portion of the overcoat member 3 having a diameter A shows an eccentric state or an irregularity, the grinding speed can be adjusted corresponding to increase or decrease of a grinding amount and it is preferred to rotate the whetstone 21 with an oscillation.

(7) After a grinding is finished by one circuit, the holder fix pin 40 is pushed into a fix position from the rotation position, and the grinder holder 36 is fixed.

(8) The processing steps (5)–(7) mentioned above are repeated 3–5 times. When the finger grip 39 of the eccentric bush 37 reaches the fine machining position and contacts the stopper 41, the grinder holder 36 is rotated by one circuit at that position. In this manner, the protrusion portion 11 having a shape G (using any shape other than circular or half-circular) is integrally formed with the end portion of the overcoat member 3. The protrusion portion 11 is formed by following a shape G' of the recess 22 arranged at a side surface of the whetstone 21.

(9) The air supply is stopped (the rotation of the whetstone 21 is stopped), and the holder fix pin 40 returns to the fix position. After loosening the knob 35, the finger grip 39 of the eccentric bush 37 is returned from the fine machining position to the idling position. Next, the screwing part 32*b* is loosened, and the FRP core holder 32 is removed from the FRP core 2.

In the processing steps mentioned above, the processing steps (3)–(9) require about 5 minutes with respect to an FRP core 2 having a diameter of 24 mm. The diameter A of the large diameter portion 12 is increased or decreased or becomes eccentric corresponding to whether the shed removing is performed carefully or not or whether a relation between the FRP core 2 and the overcoat member 3 is eccentric or not. Correspondingly, the amount of grinding is varied. Therefore, the time required for performing the processing steps mentioned above is varied correspondingly. Moreover, in the embodiment shown in FIGS. 3(*a*) and (*b*), an eccentric amount of the eccentric bush 37 is 4 mm, and thus a stroke of the whetstone 21 from the fine machining position to the idling position is defined as 8 mm. Therefore, the diameter A of the large diameter portion 12 is defined within this range.

In the embodiment mentioned above, the polymer insulator formed body, which is cut out to a predetermined length and wherein the overcoat member 3 of the FRP exposed portion is removed and cleaned, is set on a suitable base horizontally and is not rotated. Instead, the whetstone 21 is rotated around the FRP core 2. However, it is possible to rotate the polymer insulator formed body instead of rotating the whetstone 21 around the polymer insulator. Moreover, a long rod insulator is shown as one embodiment of the polymer insulator. However, the diameter of the FRP core 2 is not limited, and thus the present invention can be applied to other insulators such as LP insulators and hollow porcelain. In addition, it is preferred to use a diamond whetstone in which diamond powders are electrodeposited on a metal base due to its practicability.

INDUSTRIAL APPLICABILITY

As clearly understood from the above explanations, according to the invention, the ring-shaped protrusion portion is formed integrally with the overcoat member by processing the end portion of the overcoat member. Therefore, it is possible to easily vary the shape and number of protrusion portions to be formed. Moreover, as a preferred embodiment, the producing method further includes the steps of cutting the overcoat member of the polymer insulator to a predetermined length, and processing an end portion of the thus cut overcoat member so that the ring-shaped protrusion portion and the overcoat member are integrally formed. In this case, it is possible to obtain the polymer insulator having a predetermined length from the ready-made polymer insulator or the stocked polymer insulator. Therefore, according to the method and apparatus of the invention, it is possible to effectively process small-lot orders and increase productivity by reducing the number of metal mold changing operations. In addition, the ring-shaped protrusion portion can be formed to the end portion of the overcoat member on the basis of the center of the core. Therefore, it is possible to obtain the ring-shaped protrusion portion which can achieve better securing, even if the overcoat member is eccentric at the processing position.

What is claimed is:

1. A method of producing a polymer insulator having a core, an overcoat member arranged on the core, and a fitting member for securing the core at both ends, wherein the core and the fitting member are secured under pressure at both ends of the core by contacting a ring-shaped protrusion portion arranged at both ends of the overcoat member to an open inner end of the fitting member, comprising the steps of:

forming the overcoat member on the core to define at least a sheath portion of the polymer insulator;

cutting the overcoat member of the polymer insulator at the sheath portion thereof to a predetermined length after the overcoat member is formed on the crew;

arranging a large diameter portion having a diameter larger than that of the sheath portion by cutting a root portion of a shed portion of the overcoat member faced to the cut end portion;

processing the large diameter portion to form the ring-shaped protrusion potion to have a diameter larger than that of the sheath portion integrally with the overcoat member; and securing the fitting member.

2. A method of producing a polymer insulator having a core, an overcoat member arranged on the core, and a fitting member for securing the core at both ends, wherein the core and the fitting member are secured under pressure at both ends of the core by contacting a ring-shaped protrusion portion arranged at both ends of the overcoat member to an open inner end of the fitting member, comprising the steps of:

forming the overcoat member on the core to define at least a sheath portion of the polymer insulator by forming the sheath portion of the overcoat member on the core, and adhering a shed portion of the overcoat member formed separately with the sheath portion to the sheath portion;

arranging a large diameter portion having a diameter larger than that of the sheath portion of the overcoat member at an end portion of the overcoat member, and then processing the large diameter portion to form the ring-shaped protrusion portion to have a diameter larger than that of the sheath portion integrally with the overcoat member; and securing the fitting member.

3. A method of producing a polymer insulator having a core, an overcoat member arranged on the core, and a fitting member for securing the core at both ends, wherein the core and the fitting member are secured under pressure at both ends of the core by contacting a ring-shaped protrusion portion arranged at both ends of the overcoat member to an open inner end of the fitting member, comprising the steps of:

forming the overcoat member on the core to define at least a sheath portion of the polymer insulator;

holding the core with a core holder;

rotating a whetstone having a shape for forming an end portion of the overcoat member of the polymer insulator on a rotation drive device around a center axis of the whetstone;

rotating the rotating whetstone around the core holder at a center of a central axis of the core to form the ring-shaped protrusion portion integrally with the end portion; and securing the fitting member.

4. The method according to claim 3, wherein the whetstone takes a fine machining position during a processing state and an idling position during a non-processing state with respect to the end portion of the overcoat member to which the processing is performed, by utilizing an eccentric bush for securing the rotation drive device.

* * * * *

UNITED STATES PATENT AND TRADEMARK OFFICE

CERTIFICATE OF CORRECTION

PATENT NO. : 6,811,732 B2
DATED : November 2, 2004
INVENTOR(S) : Toshiro Marumasu It is certified that error appears in the above-identified patent and that said Letters Patent is hereby corrected as shown below:

Column 7,
Line 5, change “crew” to -- core --
Line 11, change “potion” to -- portion --

Signed and Sealed this

First Day of February, 2005

JON W. DUDAS
*Director of the United States Patent and Trademark Office*